G. Q. BEDORTHA.
SPIRIT LEVEL.
APPLICATION FILED JAN. 20, 1920.

1,393,338. Patented Oct. 11, 1921.

Inventor:
George Q. Bedortha,
Harry R. Williams

UNITED STATES PATENT OFFICE.

GEORGE Q. BEDORTHA, OF WINDSOR, CONNECTICUT.

SPIRIT-LEVEL.

1,393,338.      Specification of Letters Patent.      Patented Oct. 11, 1921.

Application filed January 20, 1920. Serial No. 352,664.

*To all whom it may concern:*

Be it known that I, GEORGE Q. BEDORTHA, citizen of the United States, residing at Windsor, in the county of Hartford and State of Connecticut, have invented a new and useful Improvement in Spirit-Levels, of which the following is a specification.

This invention relates to the construction of those implements which are employed for leveling and plumbing surfaces.

The object of the invention is to provide an implement of this character which is simple to manufacture, light in weight, durable in structure and accurate in use.

This object is attained by making the leveling and plumbing surface of sheet metal bars that are easily pressed or rolled to shape and connecting the bars by means of stamped sheet metal plates which are so designed and secured as to hold the bars firmly against distortion.

Figure 1:
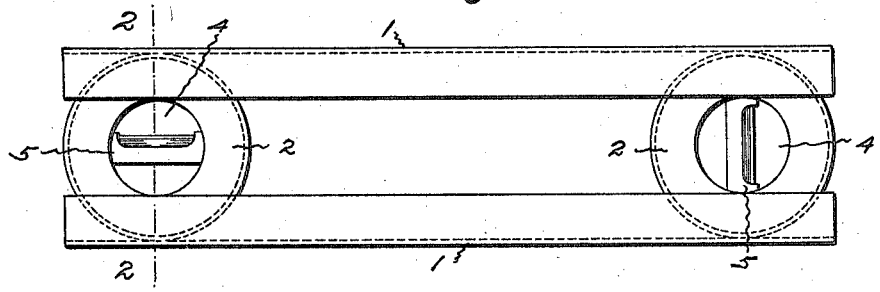
Figure 2:
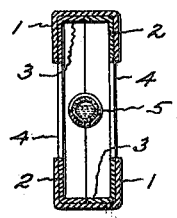
Figure 3:
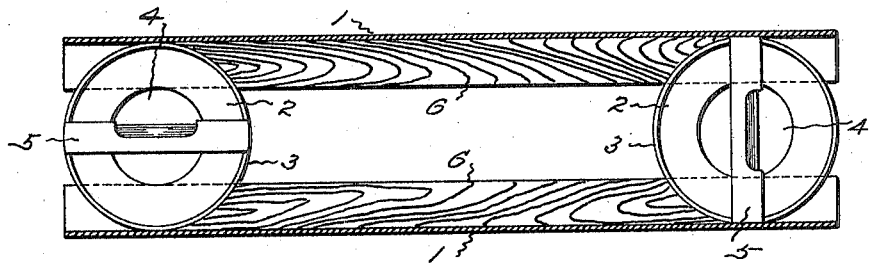

In the accompanying drawings Figure 1 shows a side view of a spirit level that embodies the invention. Fig. 2 is a transverse section of the same on the plane indicated by the dotted line 2—2 on Fig. 1. Fig. 3 is a central longitudinal section of the level.

In the embodiment of the invention illustrated the bars 1 are made the desired length and width of suitable metal, as sheet steel, rolled or pressed to channel form in cross section. These channel bars are arranged parallel with their openings toward each other and are secured together in this relation by any desired number of metal plates 2. The plates shown are circular in outline with flanges 3 around their edges and openings 4 through their sides. Pairs of these plates may be placed edge to edge at the desired localities along the openings in the channel bars and the sections of their sides and flanges and the sections of the side and bottom walls of the openings in the channel bars which are in contact may be secured together in any convenient manner, preferably by electric welding the parts together so as to form a homogeneous structure. Recesses may be made in the adjacent edges of the cup-shaped tie plates for receiving the spirit tubes or bubble glasses 5. If the plates are designed to hold the spirit tubes they are adjusted before being secured in place in the channels of the bars so that the tubes will extend parallel with the bars for leveling use or at right angles with the bars for plumbing purposes, the bubbles in the tubes being readily observed through the openings in the sides of the plates whichever way the tubes are set. For the purpose of making the structure more rigid and convenient to handle, filling pieces 6 of wood or other materials may be placed in the channels between the tie pieces.

The implement described can be manufactured very cheaply, for the bars may be readily rolled or pressed from sheet metal to the desired channel form in any length, width or thickness and the tie plates may be stamped to shape in large quantities. When put together the structure is firm, for the tie plates if in cup form are rigid, and with the sides of the plates secured to the sides of the channels and the edges of the flanges secured to the bottoms of the channels in the bars the parts cannot yield. Any desired number of plates may be arranged between the bars, depending upon the length of the implement to be produced. This implement when thus manufactured is light in weight, it can be made very accurate and is not likely to become damaged or distorted in use.

The invention claimed is:—

1. A spirit level comprising two oppositely disposed independent metal channel bars, flanged metal tie plates with the flanges attached to and securing said channel bars together, and a bubble glass located between said bars.

2. A spirit level comprising two metal bars arranged parallel with each other, cup-shaped tie plates securing said bars together, and a bubble glass held by said tie plates.

3. A spirit level body comprising two oppositely disposed channel bars and cup-shaped plates securing said bars together.

4. A spirit level comprising two oppositely disposed channel bars arranged parallel with each other and pairs of cup-shaped plates arranged edge to edge securing said bars together.

5. A spirit level comprising two oppositely disposed channel bars, and flanged plates securing said bars together, the flanges of said plates being provided with means for receiving a bubble glass.

6. A spirit level comprising two oppositely arranged channel bars and pairs of cup-shaped tie plates arranged edge to edge secured to the side and bottom walls of the openings in said channel bars, and spirit tubes held by the walls of the tie plates.

7. A spirit level comprising two metal bars arranged parallel with each other, cup-shaped tie plates securing the bars together, and a bubble glass located between said bars.

8. A spirit level body comprising two oppositely disposed channel bars and annular tie members securing said bars together.

GEORGE Q. BEDORTHA.